United States Patent
Jibb et al.

(10) Patent No.: US 12,253,024 B2
(45) Date of Patent: Mar. 18, 2025

(54) RECUPERATIVE HEAT EXCHANGER SYSTEM

(71) Applicant: LUMMUS TECHNOLOGY LLC, Bloomfield, NJ (US)

(72) Inventors: Richard John Jibb, Bloomfield, NJ (US); David Guymon, Bloomfield, NJ (US); Ron Herbanek, Bloomfield, NJ (US); Vincenzo Marco Brignone, Bloomfield, NJ (US); Roberto Groppi, Bloomfield, NJ (US)

(73) Assignee: LUMMUS TECHNOLOGY LLC, Bloomfield, NJ (US)

( * ) Notice: Subject to any disclaimer, the term of this patent is extended or adjusted under 35 U.S.C. 154(b) by 0 days.

(21) Appl. No.: 17/321,212

(22) Filed: May 14, 2021

(65) Prior Publication Data

US 2021/0404350 A1    Dec. 30, 2021

Related U.S. Application Data

(60) Provisional application No. 63/045,675, filed on Jun. 29, 2020.

(51) Int. Cl.
*F02C 6/18* (2006.01)
*F02C 3/34* (2006.01)
(Continued)

(52) U.S. Cl.
CPC ............... *F02C 6/18* (2013.01); *F02C 3/34* (2013.01); *F02C 7/10* (2013.01); *F28D 7/06* (2013.01);
(Continued)

(58) Field of Classification Search
CPC .... F02C 3/34; F02C 7/047; F02C 6/16; F02C 6/18; F02C 7/08–105; F02M 26/22–33;
(Continued)

(56) References Cited

U.S. PATENT DOCUMENTS

| 848,044 A | 3/1907 | Patrick |
| 1,757,343 A | 5/1930 | Steinmüller |

(Continued)

FOREIGN PATENT DOCUMENTS

| CN | 105247174 A | 1/2016 |
| DE | 3441972 A1 | 5/1986 |

(Continued)

OTHER PUBLICATIONS

Tom Shepstone, Turning Natural Gas into Water: Hydraulic Fracturing doesn't deplete water supplies, Apr. 6, 2012, https://www.energyindepth.org/turning-natural-gas-into-water-hydraulic-fracturing-doesnt-deplete-water-supplies-2/#:~:text=When%20one%20molecule%20of%20methane, the%20tot (Year: 2012).*

(Continued)

*Primary Examiner* — Stephanie Sebasco Cheng
(74) *Attorney, Agent, or Firm* — Seed IP Law Group LLP

(57) ABSTRACT

A system may include a turbine and a recuperative heat exchanger system. The recuperative heat exchanger system is configured to receive exhaust gases from the turbine. The recuperative heat exchanger system may include a precool section to cool the exhaust gases, a major heating section to receive the cooled the exhaust gases, and a minor heating section to receive the cooled the exhaust gases.

17 Claims, 4 Drawing Sheets

(51) Int. Cl.
*F02C 7/10* (2006.01)
*F28D 7/06* (2006.01)
*F28D 20/00* (2006.01)
*F28D 21/00* (2006.01)
*F01K 9/00* (2006.01)

(52) U.S. Cl.
CPC .......... *F28D 21/0003* (2013.01); *F01K 9/003* (2013.01); *F05D 2220/72* (2013.01); *F28D 2020/0082* (2013.01); *F28D 2020/0086* (2013.01); *F28D 21/001* (2013.01); *F28D 21/0014* (2013.01); *F28D 2021/0026* (2013.01); *Y02E 20/16* (2013.01)

(58) Field of Classification Search
CPC .............. F05D 2270/306; F28D 9/0006; F28F 2260/02; F28F 3/048
See application file for complete search history.

(56) References Cited

U.S. PATENT DOCUMENTS

| | | | |
|---|---|---|---|
| 1,961,233 A | 6/1934 | Mayr | |
| 2,056,492 A | 10/1936 | Stout | |
| 2,204,144 A | 6/1940 | Moore et al. | |
| 2,876,975 A | 3/1959 | Short | |
| 2,920,873 A | 1/1960 | Schluderberg et al. | |
| 2,962,007 A | 11/1960 | Koch | |
| 3,208,436 A | 9/1965 | Godshalk | |
| 3,479,994 A | 11/1969 | Kreider et al. | |
| 3,526,274 A | 9/1970 | Gardner | |
| 3,814,063 A | 6/1974 | Bijmholt | |
| 4,236,574 A | 12/1980 | Bosne | |
| 4,539,940 A * | 9/1985 | Young | F22B 1/021 122/32 |
| 5,203,405 A * | 4/1993 | Gentry | F28D 7/06 165/161 |
| 6,189,608 B1 | 2/2001 | Bodas et al. | |
| 6,305,330 B1 | 10/2001 | Darling | |
| 6,532,745 B1 | 3/2003 | Neary | |
| 6,629,413 B1 | 10/2003 | Wendt et al. | |
| 7,240,640 B2 | 7/2007 | Kinnunen | |
| 8,272,429 B2 * | 9/2012 | Inatomi | F28D 7/1676 165/157 |
| 8,596,075 B2 | 12/2013 | Allam et al. | |
| 8,661,780 B2 * | 3/2014 | Wettstein | F02C 6/12 60/39.52 |
| 8,959,887 B2 * | 2/2015 | Allam | F02C 3/04 60/39.5 |
| 9,657,604 B2 * | 5/2017 | Sjödin | F01K 23/10 |
| 10,018,115 B2 * | 7/2018 | Allam | F25J 3/04018 |
| 10,415,434 B2 | 9/2019 | Allam et al. | |
| 10,422,252 B2 | 9/2019 | Allam et al. | |
| 10,711,695 B2 | 7/2020 | Allam et al. | |
| 11,073,080 B2 * | 7/2021 | Conlon | F01K 25/10 |
| 2012/0023893 A1 * | 2/2012 | Yoo | F28F 3/048 60/39.83 |
| 2012/0023947 A1 * | 2/2012 | Kulkarni | F23J 15/06 60/693 |
| 2016/0053721 A1 * | 2/2016 | Fletcher | F02C 9/18 60/226.3 |
| 2017/0152765 A1 | 6/2017 | Uechi et al. | |
| 2018/0073434 A1 * | 3/2018 | Allam | F02C 3/04 |
| 2018/0073723 A1 | 3/2018 | Lankinen | |
| 2018/0106473 A1 | 4/2018 | Shimono et al. | |
| 2018/0230904 A1 | 8/2018 | Conlon | |
| 2019/0063319 A1 | 2/2019 | Forrest | |
| 2021/0087949 A1 * | 3/2021 | Han | F01K 23/103 |

FOREIGN PATENT DOCUMENTS

| | | |
|---|---|---|
| EA | 200101136 A1 | 4/2002 |
| EA | 201400520 A1 | 10/2014 |
| EA | 201790148 A1 | 7/2017 |
| EP | 0 764 814 A1 | 3/1997 |
| EP | 0990780 A1 | 4/2000 |
| EP | 1 703 041 A1 | 9/2006 |
| JP | H08-285206 A | 11/1996 |
| JP | 2001-304785 A | 10/2001 |
| JP | 2003035164 A | 2/2003 |
| RU | 179529 U1 | 5/2018 |
| RU | 2690308 C1 | 5/2019 |
| WO | 2007097573 A1 | 8/2007 |
| WO | 2019165807 A1 | 9/2019 |

OTHER PUBLICATIONS

International Search Report issued in International Application No. PCT/US2021/032580 dated Oct. 21, 2021 (5 pages).
Written Opinion issued in International Application No. PCT/US2021/032580 dated Oct. 21, 2021 (7 pages).

* cited by examiner

RECUPERATIVE HEAT EXCHANGER SYSTEM

BACKGROUND

Thermal power cycles typically use either air breathing gas turbine direct fired Brayton Cycle or indirectly heated closed Rankine Cycle with steam as a working fluid. High efficiencies are obtained by combining the Brayton cycle with a bottoming Rankine Cycle to form a combined cycle. Whilst combined cycle power generation may achieve high efficiency, combined cycle power generation is not suitable for CO2 capture, and the installation can have high capital cost due to the large amount of equipment and pipe work required. In some case, a Supercritical CO2 (SCCO2) Brayton thermal power cycle may be used over the thermal power cycles. Advantageously, Supercritical CO2 (SCCO2) Brayton thermal power cycle may have reduced Greenhouse Gas (GHG) emissions, improved carbon capture, higher efficiency, reduced footprint and lower water consumption. However, there are several technical challenges that must be overcome before the benefits of Supercritical CO2 (SCCO2) Brayton thermal power cycle may be realized. In particular, the design and operation of recuperative heat exchangers for these Supercritical CO2 (SCCO2) Brayton thermal power cycles are an ongoing area of research and development.

A semi-closed direct fired oxy-fuel Brayton cycle may be called an Allam Power Cycle or Allam Cycle. The Allam Cycle is a process for converting fossil fuels into mechanical power, while capturing the generated carbon dioxide and water. Conventionally, the Allam Cycle requires an economizer heat exchanger and an additional low-grade external heat source to achieve high efficiency comparable to existing combined cycle-based technology, with the crucial added benefit of CO2 capture for use or storage. The efficiency of the Allam Cycle is increased if the turbine is operated at higher temperatures typically above 600° C. and at high pressure of 120 to 400 bar. These conditions lead to the simultaneous requirements of high-pressure high temperature and high effectiveness for the heat exchange system. Typically, multiple individual heat exchange units are required, and must be arranged in a network to achieve the required recuperative heat exchange simultaneously with heat recovery from the external low-grade heat source. Examples of conventional heat exchanger systems and methods may be found in U.S. Pat. Nos. 8,272,429; 8,596,075; 8,959,887; 10,018,115; 10,422,252; and U.S. Pat. Pub. No. 2019/0063319. All of which are incorporated herein by reference.

Conventionally, heat exchanger systems may be split into high, medium and low temperature sections. Whilst it is desirable to cool the exhaust gas in the high temperature section to the lowest temperature (for instance a temperature coincident with the low grade heat source temperature), this is in conflict with the mechanical requirements that drive the layout, cost and reliability of such a system. Typically, the design temperature and pressure of the high temperature section are set by the highest temperature and pressure which in turn drives the mechanical requirements.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system. The system may include a turbine and a recuperative heat exchanger system. The recuperative heat exchanger system is configured to receive exhaust gases from the turbine. The recuperative heat exchanger system may include a precool section to cool the exhaust gases, a major heating section to receive the cooled the exhaust gases, and a minor heating section to receive the cooled the exhaust gases.

In another aspect, embodiments disclosed herein relate to a method. The method may include producing exhaust gas via a turbine; feeding the exhaust gas into a precool section of a recuperative heat exchanger system to cool the exhaust gas; splitting the cooled exhaust gas into a major flow path feeding into a major heating section of the recuperative heat exchanger system and a minor flow path feeding into a minor heating section of the recuperative heat exchanger system; flowing, in the minor flow path the cooled exhaust gas through a first minor heat exchanger of the minor heating section and a second minor heat exchanger of the minor heating section; flowing, in the major flow path the cooled exhaust gas through a first major heat exchanger of the major heating section, a second major heat exchanger of the major heating section, and a third major heat exchanger of the major heating section; and providing a combustor, coupled to the turbine, with fluid flow from the major flow path and the minor flow path.

In yet another aspect, embodiments disclosed herein relate to a precool heat exchanger. The precool heat exchanger may include a first annular shell forming a pressure boundary. The first annular shell may have an exhaust gas inlet configured to receive exhaust gas from a turbine and one or more exhaust outlets configured to exhaust the exhaust gas. The precool heat exchanger may also include a second annular shell provided within the first annular shell. The precool heat exchanger may further include a tube bundle provided within the second annular shell. Additionally, an annular distribution device may be provided within the second annular shell, the annular distribution device is configured to control an exhaust gas flow entering the tube bundle.

Other aspects and advantages of the invention will be apparent from the following description and the appended claims.

DETAILED DESCRIPTION

Figure 1A:
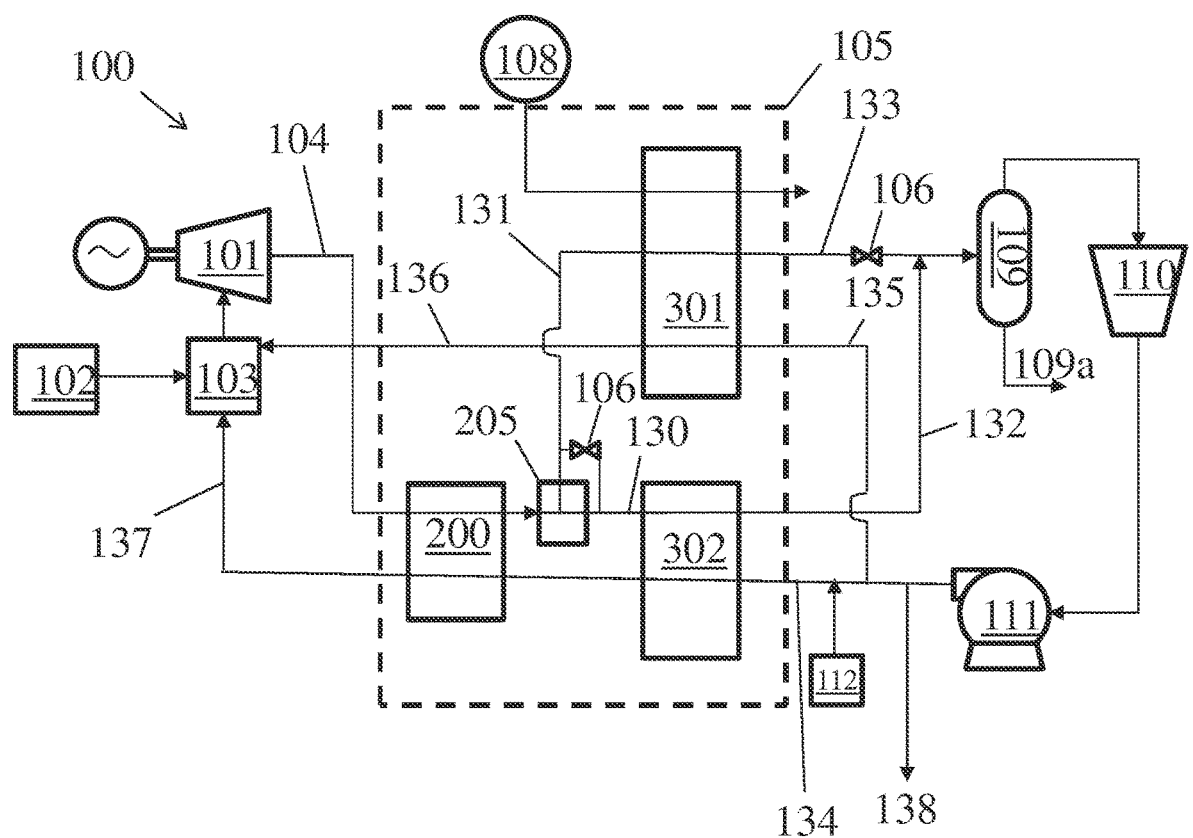
FIGS. 1A and 1B illustrate a schematic view of a power generation system in accordance with one or more embodiments of the present disclosure.

Embodiments of the present disclosure are described below in detail with reference to the accompanying figures. Like elements in the various figures may be denoted by like reference numerals for consistency. Further, in the following detailed description, numerous specific details are set forth in order to provide a more thorough understanding of the claimed subject matter. However, it will be apparent to one having ordinary skill in the art that the embodiments described may be practiced without these specific details. In other instances, well-known features have not been described in detail to avoid unnecessarily complicating the description. As used herein, the term "coupled" or "coupled to" or "connected" or "connected to" may indicate establishing either a direct or indirect connection and is not limited to either unless expressly referenced as such. As used herein, fluids may refer to slurries, liquids, gases, and/or mixtures thereof. Wherever possible, like or identical reference numerals are used in the figures to identify common or the same elements. The figures are not necessarily to scale, and certain features and certain views of the figures may be shown exaggerated in scale for purposes of clarification.

In one aspect, embodiments disclosed herein relate to a power generation system for electricity generation, petrochemical plants, waste heat recovery, and other industrial applications. The power generation system may also be interchangeably referred to as a recuperative heat exchanger system as a network or assembly of heat exchangers in the present disclosure. Additionally, the recuperative heat exchanger system may incorporate a precooling section to reduce turbine exhaust gas temperature. The recuperative heat exchanger system may minimize life cycle cost of heat exchangers that are critical to efficient recuperative thermal energy exchange at high pressure and with high thermal effectiveness. In some embodiments, the recuperative heat exchanger system may be used for Supercritical Carbon Dioxide (SCCO2) power cycles, such as an Allam cycle.

Recuperative heat exchanger systems, according to embodiments herein, may include a combination of Printed Circuit type (PCHE) and Shell and Tube type (STHE) heat exchangers. For example, the recuperative heat exchanger system may include a precool section, a major heating section (recycle heating), and a minor heating section (oxidant heating). In some embodiments, a heat recovery section may be optionally connected to the major heating section and/or the minor heating section.

In one or more embodiments, the recuperative heat exchanger system may use a heat exchanger network that incorporates parallel sections for heating of a minor portion of a high-pressure gas and a major portion of the high-pressure gas. The minor portion may consist of the oxygen containing CO2 (Oxidant) and the major portion may consist of the balance of the recirculated CO2 (Recycle CO2). The two parallel sections may have substantially different temperature profiles. In a non-limiting example, the major portion (about 75% of a total flow, in a range 51-90%) may be heated to a lower temperature than the minor portion. The minor portion may be first heated to an intermediate temperature of approximately 440° C. (in a range of 350-550° C.) before being used to precool the entire high temperature exhaust stream from a high temperature approximate 600° C. (in a range of 550-850° C.) to a temperature low enough to avoid a significant mechanical design constraint, and in particular to a temperature below 575° C. The 575° C. limit may represent a mechanical design constraint when diffusion bonded PCHE are employed and are fabricated from austenitic stainless steel and in particular alloy 316/316L. PCHE Alloy 316 blocks may require allowable stresses that are determined from time dependent (creep) properties at temperatures above 575° C. Further, a heat recovery section may be provided in the recuperative heat exchanger system. The heat recovery section may add heat at a temperature below the combustion temperature, e.g. low-grade heat.

Conventional power generation systems in industrial applications are typically exceptionally large and heavy. Conventional power generation systems may include an extensive layout and arrangement of pipes that require a large space and weigh several tons each. In some instances, large heat exchangers connected in series and may include complicated bends or changes in orientation. Additionally, large manifolds are needed to introduce fluids into the heat exchanges as well as when the fluids exit the heat exchanges. Such power generation systems may be both heavier in weight and may also be more expensive to manufacture because of the higher number of parts and components. For example, stress loops are used to accommodate an expansion of the pipework within the system. This additional pipework of stress loops needed to connect the various manifolds and heat exchangers together adds to the weight, installation costs, and overall cost of power generation systems.

Accordingly, one or more embodiments in the present disclosure may be used to overcome such challenges as well as provide additional advantages over conventional power generation systems, as will be apparent to one of ordinary skill. In one or more embodiments, a recuperative heat exchanger system may be lighter in weight and lower in cost as compared with conventional power generation systems due, in part, minimizing creep fatigue/damage, independent oxidant and recycle sections such that exhaust fluid flow split may be controlled with one or more low temperature valves, and exhaust fluid leaving the turbine does not require a balancing vessel to be placed between the turbine and recuperative heat exchanger. Additionally, the recuperative heat exchanger system may increase reliability and performance for thousands of hours where some components of the recuperative heat exchanger system are subject to high pressures, high temperatures and cycles of operation. Overall, the recuperative heat exchanger system may minimize product engineering, risk associated with flow loops manufacture, reduction of assembly time, hardware cost reduction, and weight and envelope reduction.

Turning to FIG. 1A, FIG. 1A shows a schematic view of a power generation system 100 in accordance with one or more embodiments of the present disclosure. In one or more embodiments, a turbine 101 may be powered by fuel source 102 via a combustor 103. As known in the art, a turbine, such as the turbine 101 may be a structure useful for extracting energy from a fluid flow and converting the fluid flow into useful work, such as to drive a generator to produce electricity, and is often a rotary device with other components (i.e., rotor, stator, and/or turbine blades) having various functions relevant to producing or converting mechanical energy. It is noted that the turbine 101 in one or more embodiments may be configured as a gas or steam turbine. The combustor 103 may be a component of the turbine 101 where combustion takes place, such as a chamber. Additionally, an oxygen supply 112 may be provided to feed oxygen into the combustor 103. As known to those of ordinary skill in the art, the turbine 101 may produce exhaust gases 104. The exhaust gases 104 may be fed into a recuperative heat exchanger system 105 (see dotted square) to form a turbine exhaust gas stream.

In one or more embodiments, the recuperative heat exchanger system 105 may include a precool section 200, a major heating section 301, and a minor heating section 302. In some embodiments, the major heating section 301 may be a recycle heating section and the minor heating section 302 may be an oxidant heating section. The precool section 200 may be high-temperature pre-coolers having shell and tube type construction wherein the shell that may be combined with an annular distributor. Both the major section 301 and the minor section 302 may include at least two heat exchangers vertically stacked on top of each other to form a vertically modular heat exchanger stack.

Still referring to FIG. 1A, all the exhaust gas 104 leaving the turbine may be fed into the precool section 200. The precool section 200 may cool the exhaust gas 104 against a minor portion of a high-pressure gas to be heated, and preferably against an oxidant stream before redistribution to independent parallel trains (e.g., the major section 301 and the minor section 302). In this way, the exhaust gas 104 may be directly cooled prior to entering the major section 301 and the minor section 302, with a significant saving in cost and increase in reliability. Additionally, a manifold 205 may be optionally used to split the cooled exhaust gas 104 into streams entering the major section 301 and the minor section 302. The cooled exhaust gas 104 may split to a major flow path 131 feeding into the major section 301 and a minor flow path 130 feeding into the minor section 302. Further, one or more valves (not shown) may be used to balance a split of the exhaust gas flow 104 flowing from the major section 301 and into the minor section 302. Further, flow resistances may be provided in both the major section 301 and the minor section 302 to balance the flow of the exhaust gas 104. Furthermore, a flow may exit the major section 301 via flow lines 133 while a flow may exit the minor section 302 via flow lines 132. In some embodiments, one or more valves 106 may be provided on the flow lines 133.

In some embodiments, heat recovery systems may be operationally coupled to the recuperative heat exchanger system 105. The heat recovery systems may add heat at a temperature below the combustion temperature. Further examples of the heat recovery systems include, but are not limited to, directly or indirectly adding heat (via a low-grade heat source 108) to the turbine exhaust gas stream, recovering heat from an Air Separation Unit (ASU) coupled to a compressor (not illustrated), or recovering heat from a recycle gas compressor discharge from the compressor (not illustrated). In a non-limiting example, a flow line 134 from a pump 111 may feed into the minor section 302 while a flow line 135 from the pump 111 may feed into the major section 301. In addition, a separator 109 may separate liquid condensate from exhaust gas such that liquid condensates 109a may be collected. Further, a compressor 110 may be coupled to the separator 109. Additionally, from the pump 111, a discharge flow line 138 may be provided for product Carbon Dioxide (CO2) to exit the power generation system 100. In some embodiments, the heat recovery systems may be incorporated into the major section 301. It is further envisioned that a series of manifolds within the recycle and heat recovery sections may be used to redistribute the recycled high-pressure carbon dioxide and to provide draw points for the various turbine cooling flows that may be required. Further, a first flow back line 136 from the major section 301 and a second flow back line 137 from the minor section 302 may be used to provide the combustor 103 with fluid flow from the major section 301 and the minor section 302.

Figure 1B:
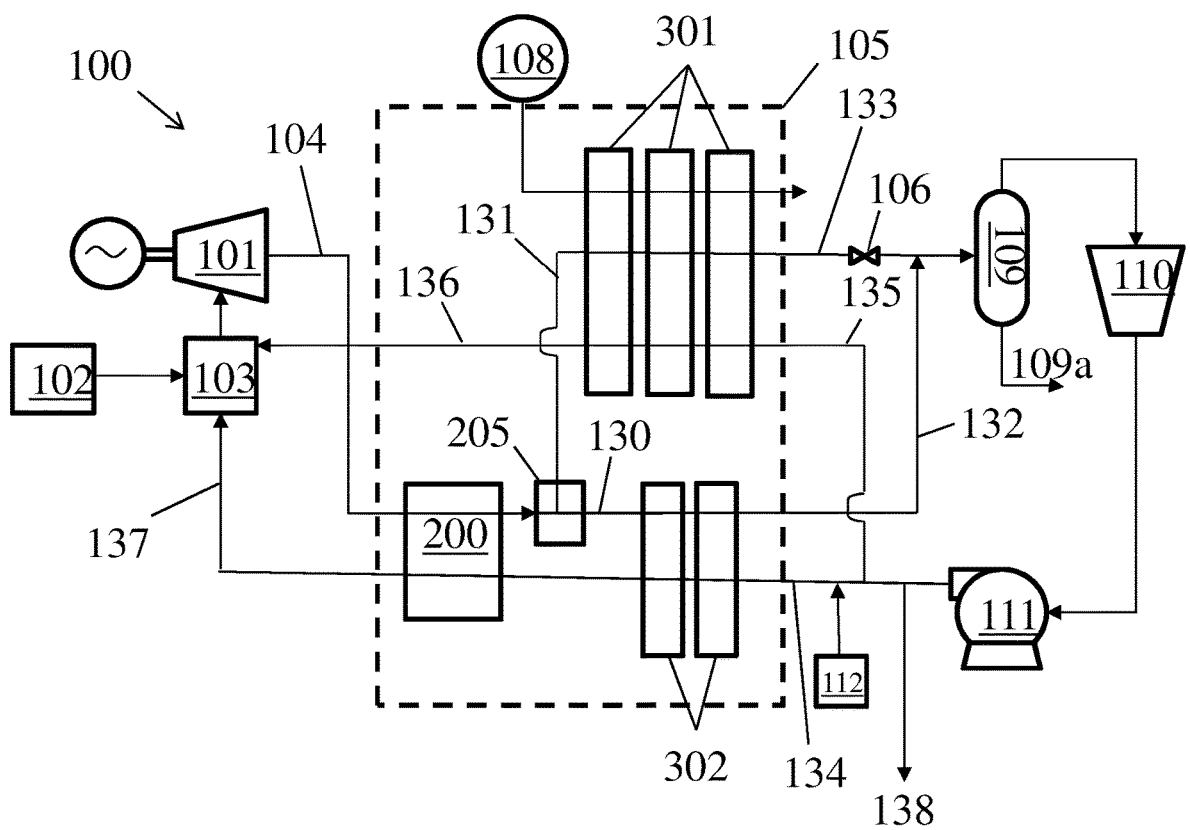

Referring now to FIG. 1B, another embodiment of a power generation system 100 according to embodiments herein is illustrated, where like numerals represent like parts. The embodiment of FIG. 1B is similar to that of the embodiment of FIG. 1A. However, in place of just one heat exchanger, the major section 301 and the minor section 302 may both include two or more vertically modular heat exchanger stacks in series. The PCHE blocks may have a maximum size based on a plate size that can be accommodated within a diffusion bonding furnace, and thus, it may be beneficial to have more than one vertically modular heat exchanger stack. In some embodiments, there may be a need to re-distribute the high-pressure stream between the major section 301 and the heat recovery section, and thus, it may be beneficial to have more than one vertically modular heat exchanger stack.

Figure 2:
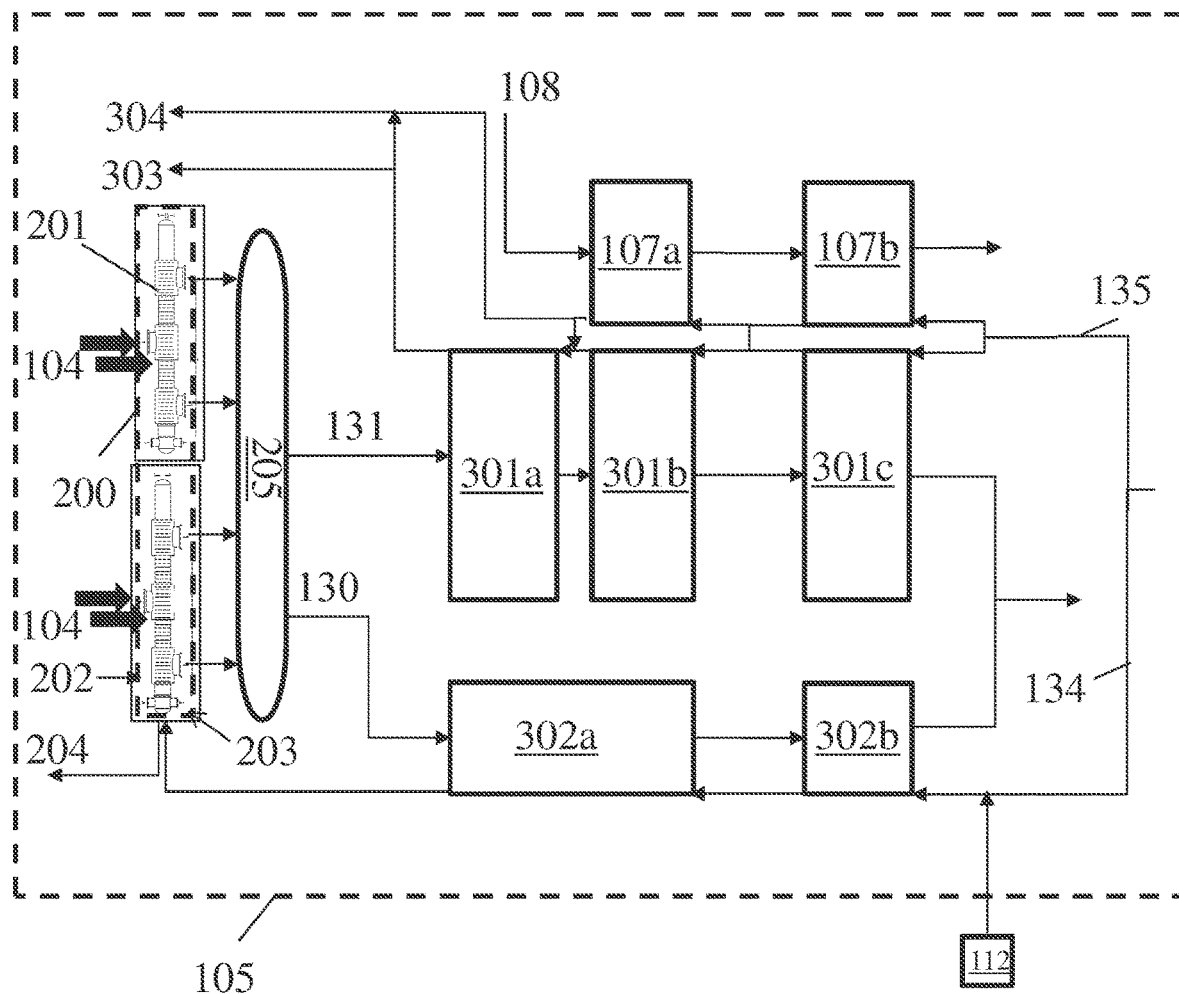
FIG. 2 illustrates a schematic view of a recuperative heat exchanger system in accordance with one or more embodiments of the present disclosure.

FIG. 2 illustrates a close-up schematic view of a recuperative heat exchanger system 105 according to embodiments herein is illustrated, where like numerals represent like parts. As shown by arrows 104, exhaust gas leaving a turbine may enter a precool section 200 via one or more transfer pipes. In a non-limiting example, four nominally identical transfer pipes may be used to transfer the exhaust gas (arrows 104) to the precool section 200. It is noted that any number of transfer pipes may be used without departing from the scope of the present disclosure.

In one or more embodiments, the precool section 200 may include one or more shell and tube heat exchangers ("STHE") 201. The STHE 201 of the precool section 200 may be made from a material selected from an INCONEL material (e.g. Alloy 625 or Alloy 617) or a similar material that is not subject to time dependent properties at a highest temperature. The one or more transfer pipes may be connected a shell-side 202 of the STHE 201. In a non-limiting example, each STHE 201 may have one transfer pipe connected thereof. On a tube-side 203 of the STHE 201, the STHE 201 may receive a fluid flow (e.g., oxidant fluid) from a minor section (302a, 302b). In some embodiments, a mass heat capacity (e.g., mass flow x specific heat capacity) of a tube-side fluid of the STHE 201 may be lower than the mass heat capacity of the exhaust gas (arrows 104) entering the STHE 201 on the shell-side 202. Based on the lower mass heat capacity of an oxidant fluid on the tube-side, a temperature change of the exhaust gas may be small (e.g., 15-50° C.) whilst a temperature change of an oxidant stream may be large (e.g., 100-200° C.). It is further envisioned that the STHE 201 may include a heated oxidant outlet 204 for the oxidant stream to exit. From the STHE 201, the exhaust gas may enter a manifold 205 to split the exhaust gas flow.

In some embodiments, the manifold 205 may split the exhaust gas along various flow paths. In a non-limiting example, the manifold 205 splits the exhaust gas into two flow paths, namely the minor flow path 130 (which may also be referred to herein as an exhaust gas minor stream 130) and the major flow path 131 (which may also be referred to herein as an exhaust gas major stream 131)

In the exhaust gas minor stream 130, the exhaust gas flows through the minor section having a first minor heat exchanger 302a and a second minor heat exchanger 302b. Both the first minor heat exchanger 302a and the second minor heat exchanger 302b may be a printed circuit type heat exchanger ("PCHE"), a coil wound type heat exchanger, a micro-tube heat exchanger, a diffusion bonded exchanger using stamped fins in addition to etched plates or any other type heat exchanger. In addition, both the first minor heat exchanger 302a and the second minor heat exchanger 302b may be constructed from a suitable material, such as of dual certified stainless steel 316/316L. Additionally, the first minor heat exchanger 302a may be operated at a higher temperature than the second minor heat exchanger 302b. Further, the exhaust gas may be used to preheat the minor stream 134 to 350-500° C. In some embodiments, both the first minor heat exchanger 302a and the second minor heat exchanger 302b may be used for oxidant heating.

In the exhaust gas major stream 131, the exhaust gas flows through the major section having a first major heat exchanger 301a, a second major heat exchanger 301b, and a third major heat exchanger 301c. Each of the major heat exchangers 301a, 301b, 301c may be a printed circuit type heat exchanger ("PCHE"), a coil wound type heat exchanger, a micro-tube heat exchanger, a diffusion bonded exchanger using stamped fins in addition to etched plates or any other type heat exchanger. Additionally, the first major heat exchanger 301a may be operated at a highest temperature in the major section while the third major heat exchanger 301c may operate a lowest temperature in the major section. The second major heat exchanger 301b may operate at a temperature between the first major heat exchanger 301a and the third major heat exchanger 301c. In addition, each of the major heat exchangers 301a, 301b, 301c may be constructed from a material of dual certified stainless steel 316/316L. Further, the exhaust gas major stream 131 may be used to preheat the major stream 135 to 520-650° C. In some embodiments, each of the major heat exchangers 301a, 301b, 301c may be used for heating recycle CO2 along line 303. Additionally, a second flow line 304 may be used to provide the turbine with a cooling flow. In a non-limiting example, the cooling flow may be a recycle gas leaving 107a or 301b. In some cases, a temperature of the cooling flow may not match a required turbine coolant temperature. In order to match the required turbine coolant temperature, hot gas or cold gas may be added to the cooling flow to raise or lower the temperature to match the required turbine coolant temperature. In some embodiments, the cooling flow may be a blended mixture from the recycle stream leaving 107a or 301b and the higher temperature recycle stream leaving 301a.

In some embodiments, a flow balance of the gas exhaust between the minor section (302a, 302b) and the major section (301a, 301b, 301c) may be controlled by flow resistances in the minor section (302a, 302b) and the major section (301a, 301b, 301c). In a non-limiting example, one or more valves at an outlet (i.e., a cold end) of the minor section (302a, 302b) may be used for flow balance.

In the heat recovery stream 108, recycled exhaust gas or a separate low-grade heat stream may be used to add heat at a temperature below a combustion temperature via a first recovery heat exchanger 107a and a second recovery heat exchanger 107b. In some embodiments, the recycled exhaust gas may be exhaust gas that is reheated and recycled back through the heat recovery sections 107a and 107b. Both the first recovery heat exchanger 107a and the second recovery heat exchanger 107b may be a printed circuit type heat exchanger ("PCHE"), a coil wound type heat exchanger, a micro-tube heat exchanger, a diffusion bonded exchanger using stamped fins in addition to etched plates or any other type heat exchanger. In addition, both the first recovery heat exchanger 107a and the second recovery heat exchanger 107b may be constructed from a suitable material, such as dual certified stainless steel 316/316L. Further, the first recovery heat exchanger 107a may be at a higher temperature than the second recovery heat exchanger 107b. In some embodiments, the first recovery heat exchanger 107a and the second recovery heat exchanger 107b may be integrated into the second major heat exchanger 301b and the third major heat exchanger 301c, respectively.

In one or more embodiments, the precool section 200 may cool the exhaust gas. In a non-limiting example, the exhaust gas 104 may be precooled to a temperature of 575° C. By precooling the exhaust gas 104 to 575° C., an available temperature difference for first major heat exchanger 301a may be reduced. This may be compensated for by using additional heat transfer surface area, or by increasing the overall heat transfer coefficient. The product of the overall heat transfer coefficient and the heat transfer surface area may be called UA which is equivalent to the heat duty divided by the mean temperature difference LMTD which may be calculated from the inlet and outlet temperatures of the hot stream and cold stream. The UA value of a heat exchanger may be related to the cost of the heat exchanger. By including the precool section 200 in the recuperative heat exchanger system 105, the required UA may increase overall by about 15%. However, a difference in cost (e.g., a value of cost/UA) between the high temperature sections and low temperature sections may lower an overall cost of the recuperative heat exchanger system 105. In a non-limiting example, the value of cost/UA of systems above 575° C. may be more than 30% higher than the value of cost/UA of systems below 575° C. The recuperative heat exchanger system 105 may provide a lower value of cost/UA by increasing an expected life of equipment and reduced material use owing to a higher allowable stress for heat exchangers below 575° C. Although the INCONEL material of the precool section 200 may be a more expensive material, the amount of material required is relatively small because of the higher LMTD in the precool section 200, which reduces the required UA.

Embodiments herein for operating the recuperative heat exchanger system 105 may be implemented on a computing system. Any combination of mobile, desktop, server, router, switch, embedded device, or other types of hardware may be used with the recuperative heat exchanger system 105. For example, the computing system may include one or more computer processors, non-persistent storage (e.g., volatile memory, such as random access memory (RAM), cache memory), persistent storage (e.g., a hard disk, an optical drive such as a compact disk (CD) drive or digital versatile disk (DVD) drive, a flash memory, etc.), a communication interface (e.g., Bluetooth interface, infrared interface, network interface, optical interface, etc.), and numerous other elements and functionalities. It is further envisioned that software instructions in a form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. For example, the software instructions may correspond to computer readable program code that, when executed by a processor(s), is configured to perform one or more embodiments of the disclosure.

In one or more embodiments, a precool heat exchanger may be used in recuperative heat exchanger system. The precool heat exchanger may be a shell and tube heat exchanger ("STHE") for distributing exhaust gas from a turbine. In some embodiments, instead of being a STHE, the precool heat exchanger may be a printed circuit type heat exchanger ("PCHE"), a coil wound type heat exchanger, a micro-tube heat exchanger, a diffusion bonded exchanger using stamped fins in addition to etched plates or any other type heat exchanger. The precool heat exchanger may in turn fed the exhaust gas directly into heat exchangers thereby eliminating a need for a large high temperature exhaust manifold. In a non-limiting example, the STHE may replace a large high temperature exhaust manifold such that turbine exhaust gases could be directly cooled prior to entering a minor (oxidant stream) section and a major (recycled stream) section of a recuperative heat exchanger system. In some embodiments, pressure components of the precool heat exchanger may be made from a material selected from an INCONEL material (e.g. Alloy 625 or Alloy 617) or a similar material that is not subject to time dependent properties at a highest temperature. Internal components of the precool heat exchanger 500, which are non-pressure parts, may be made from a stainless steel or similar materials.

In one or more embodiments, a fluid may enter at a center and split into two streams (one going right and the other left). The fluid may leave the heat exchanger through two or more separate outlets. The streams may be combined again outside the heat exchanger through a system of pipes. In some embodiments, the fluid may enter at two or more points, combine and ultimately leave in a single outlet nozzle. Large pressure drops may cause tube vibration, which may damage to the tubes and shell. Because of this, splitting the flow in the heat exchanger may be useful for reducing the risk of damage due to vibrations and may reduce the pressured drops associated with the heat exchange system.

In some embodiments, the heat exchanger may be a double-split flow exchanger. This means the heat exchanger may have two areas where the flow is divided and then reunited, as well as two support plates. When the pressure drop needs to be kept low, a split-shell design may be employed. Further, there may be no baffle plates in the split-shell design exchanger and a single support plate is installed in the center of the shell.

Figure 3:
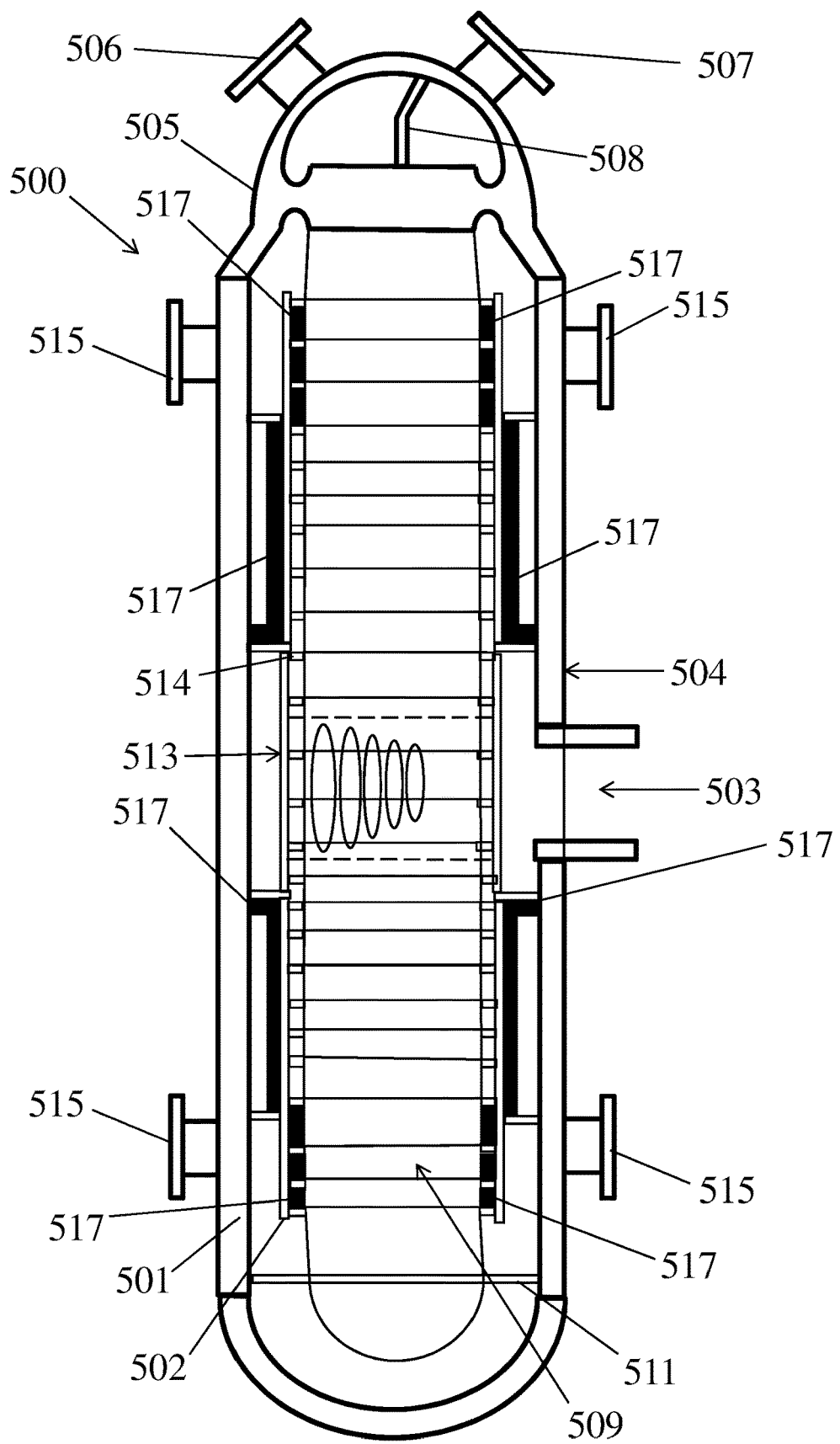
FIG. 3 is a cross-sectional view of a precool heat exchanger in accordance with one or more embodiments of the present disclosure.

Referring to FIG. 3, in one or more embodiments, FIG. 3 illustrates a precool heat exchanger 500 may have two annular shells 501, 502 and a distributor section 513. A first annular shell 501 may be an outer shell forming a pressure boundary. Additionally, the first annular shell 501 may include an exhaust gas inlet 503 may be provided on a shell-side 504 to receive exhaust gases from a turbine. A transfer pipe may be connected to the exhaust gas inlet 503 from the turbine. Further, at an end of the precool heat exchanger 500, a stationary head channel 505 with an inlet 506 and an outlet 507 may be provided. A pass partition 508 may be provided within the stationary head channel 505 to split flow between the inlet 506 and the outlet 507. The inlet 506 may be used to receive oxidant from the minor section. It is further envisioned that one or more exhaust outlets 515 may be provided on the shell-side 504 for the exhaust stream to exit.

Still referring to FIG. 3, a second annular shell 502 may be an inner shell or shroud around a tube bundle 509 with two or more tube-side passes. The tube bundle 509 may be a U-tube bundle. A support plate 511 is provided to support the weight of the tube bundle 509 and prevent overloading of the tube to tubesheet and channel 505 assembly connection. In some embodiments, a large difference between the shell-side 504 and a tube-side 509 flowrates mean that multiple passes may be used to maintain a reasonable tube-side 509 velocity and heat transfer coefficient. Additionally, an annular distribution device 513 may replace the function of an exhaust manifold by stepwise decelerating the exhaust gas flow and providing a controlled entrance to the tube bundle 509. The annular distribution device may be provided with slots that are rectangular or oval and with an open area that decreases with distance from the inlet 503. Further, the tube bundle 509 may have rods or grid type baffles to support the tubes and arranged on a baffle ring 514 rather than conventional segmental plate type baffles. It is further envisioned that insulation 517 may be provided within the precool heat exchanger 500 between various internal components.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed:

1. A system, comprising:
a turbine; and
a recuperative heat exchanger system, wherein the recuperative heat exchanger system is configured to receive exhaust gases from the turbine, and the recuperative heat exchanger system includes:
at least one precool section configured to receive and to cool all of the exhaust gases from the turbine and output a flow of cooled exhaust gases;
a major heat exchange section; and
a minor heat exchange section arranged in parallel with the major heat exchange section,
wherein the recuperative heat exchanger system is configured to split the flow of all of the cooled exhaust gases from the at least one precool section between the major heat exchange section and the minor heat exchange section, and
wherein the at least one precool section is further configured to heat an oxidant stream received from the minor heat exchange section against all of the exhaust gases from the turbine to cool all of the exhaust gases, and
wherein a temperature of the heated oxidant stream is greater than a temperature of a recycle flow from the major heat exchange section.

2. The system of claim 1, wherein the at least one precool section further comprises one or more heat exchangers associated only with the oxidant stream.

3. The system of claim 1, wherein the major heat exchange section further includes at least two heat exchangers in series, and each of the at least two heat exchangers are a printed circuit type heat exchanger and arrayed vertically.

4. The system of claim 1, wherein the minor heat exchange section is a single printed circuit type heat exchanger.

5. The system of claim 1, wherein the recuperative heat exchanger system further comprises a heat recovery section configured to add heat to the major heat exchange section.

6. The system of claim 1, wherein the major heat exchange section is a heat exchange section for the recycle flow and the minor heat exchange section is a heat exchange section for the oxidant stream.

7. The system of claim 1, further comprising:
a manifold configured to receive all of the cooled exhaust gases from the at least one precool section and split the flow of all of the cooled exhaust gases from the at least one precool section between the major heat exchange section and the minor heat exchange section,
wherein the manifold is positioned between the at least one precool section, the major heat exchange section, and the minor heat exchange section, the manifold configured to receive the flow of the cooled exhaust gases directly from the at least one precool section.

8. The system of claim 1, wherein each of the major heat exchange section and the minor heat exchange section include a respective at least two exchangers vertically stacked on each other to form a vertically modular heat exchanger stack.

9. The system of claim 1, wherein the at least one precool section includes high temperature precoolers with a shell and tube construction.

10. The system of claim 9, wherein the shell and tube construction of each of the high temperature precoolers further includes an annular distributor.

11. The system of claim 1, further comprising:
a manifold in fluid communication with the at least one precool section, the major heat exchange section, and the minor heat exchange section,
wherein the manifold is configured to split the flow of all of the cooled exhaust gases between the major heat exchange section and the minor heat exchange section.

12. A system, comprising:
a turbine configured to output exhaust gases;
a combustor in communication with the turbine; and
a recuperative heat exchanger system in communication with the turbine, including:
at least one precool section;
a major heat exchange section; and
a minor heat exchange section,
wherein the at least one precool section is configured to receive and to cool all of the exhaust gases from the turbine against an oxidant flow output from the minor heat exchange section and output a flow of cooled exhaust gases,
wherein the major heat exchange section is configured to receive a first portion of the flow of cooled exhaust gases output from the at least one precool section, and the minor heat exchange section is configured to receive a second portion of the flow of cooled exhaust gases output from the at least one precool section, an amount of the first portion being different than an amount of the second portion, and
wherein the oxidant flow output from the minor heat exchange section and a recycle flow output from the major heat exchange section are provided separately to the combustor.

13. The system of claim 12, wherein the first portion is greater than the second portion, and wherein a sum of the first portion and the second portion is an entirety of the flow of cooled exhaust gases.

14. The system of claim 12, wherein the first portion of the cooled exhaust gases is between and including 51% to 90% of a total flow of the cooled exhaust gases.

15. The system of claim 12, wherein the first portion of the cooled exhaust gases is between and including 70% to 80% of a total flow of the cooled exhaust gases.

16. The system of claim 12, wherein the recuperative heat exchanger system includes an oxygen stream that is configured to be mixed with an inlet flow to the minor heat exchange section to form an inlet mixture, and
wherein the minor heat exchange section is configured to heat the inlet mixture to produce the oxidant flow output from the minor heat exchange section, and the at least one precool section is configured to further heat the oxidant flow output from the minor heat exchange section against all of the exhaust gases from the turbine to form a heated mixture provided separately to the combustor from the recycle flow output from the major heat exchange section.

17. A system, comprising:
a turbine configured to output exhaust gases;
a combustor in communication with the turbine; and
a recuperative heat exchanger system in communication with the turbine and the combustor, wherein the recuperative heat exchanger system includes:
at least one precool section configured to receive and to cool all of the exhaust gases from the turbine and output a flow of cooled exhaust gases;
a major heat exchange section including one or more first heat exchangers in series;
a minor heat exchange section including one or more second heat exchangers in series, the minor heat exchange section arranged in parallel with the major heat exchange section,
wherein the recuperative heat exchanger system is configured to receive all of the cooled exhaust gases from the at least one precool section and split the flow of all of the cooled exhaust gases from the at least one precool section between the major heat exchange section and the minor heat exchange section; and
an oxygen stream,
wherein an output gas flow from the minor heat exchange section and an output gas flow from the major heat exchange section are configured to be combined to form a recycle gas stream,
wherein the recycle gas stream is configured to be split into a major recycle gas stream and a minor recycle gas stream,
wherein the oxygen stream is configured to be mixed with only the minor recycle gas stream following the split of the major recycle gas stream and the minor recycle gas stream to form an inlet recycle oxidant mixture provided to the minor heat exchange section,
wherein the minor heat exchange section is an oxidant heat exchange section configured to heat the inlet recycle oxidant mixture and produce an output recycle oxidant flow that is provided to the at least one precool section,
wherein the at least one precool section is configured to further heat the output recycle oxidant flow from the minor heat exchange section against all of the exhaust gases from the turbine to form a heated recycle oxidant mixture that is provided to the combustor,
wherein the at least one precool section is further configured to receive and cool all of the exhaust gases from the turbine against only the output recycle oxidant flow from the minor heat exchange section,
wherein the major heat exchange section is a recycle heat exchange section configured to heat the major recycle gas stream to form a heated recycle gas stream that is provided to the combustor as a separate stream from the heated recycle oxidant mixture,
wherein a temperature of the heated recycle oxidant mixture is greater than a temperature of the heated recycle gas stream, and
wherein the heated recycle oxidant mixture and the heated recycle gas stream are configured to be combined and heated at the combustor and provided as a combined inlet stream to the turbine in an open fluid loop.

* * * * *